United States Patent
Koo et al.

(10) Patent No.: US 8,059,525 B2
(45) Date of Patent: Nov. 15, 2011

(54) APPARATUS AND METHOD FOR PERFORMING RANGING IN A COMMUNICATION SYSTEM

(75) Inventors: Jin-Kyu Koo, Suwon-si (KR);
Young-Kwon Cho, Suwon-si (KR);
Chang-Yoon Oh, Yongin-si (KR);
Su-Ryong Jeong, Suwon-si (KR);
Tae-Young Kim, Seongnam-si (KR);
Dong-Seek Park, Yongin-si (KR);
Jun-Young Jung, Suwon-si (KR);
Joon-Young Choi, Suwon-si (KR);
Eun-Taek Lim, Suwon-si (KR);
Chang-Ho Suh, Seongnam-si (KR);
Jae-Hyuk Jang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1471 days.

(21) Appl. No.: 11/515,598

(22) Filed: Sep. 5, 2006

(65) Prior Publication Data
US 2007/0053465 A1    Mar. 8, 2007

(30) Foreign Application Priority Data

Sep. 2, 2005 (KR) .................. 10-2005-0081673
Nov. 30, 2005 (KR) .................. 10-2005-0116015

(51) Int. Cl.
*H04J 11/00* (2006.01)
*H04J 3/06* (2006.01)
(52) U.S. Cl. ......... 370/208; 370/210; 370/509; 455/139
(58) Field of Classification Search ................. None
See application file for complete search history.

(56) References Cited

U.S. PATENT DOCUMENTS

| 5,732,113 | A | 3/1998 | Schmidl et al. | |
| 6,215,792 | B1 | 4/2001 | Abi-Nassif | |
| 7,551,692 | B2* | 6/2009 | Kim | 375/326 |
| 7,564,909 | B2* | 7/2009 | Sung et al. | 375/260 |
| 7,599,327 | B2* | 10/2009 | Zhuang | 370/329 |

(Continued)

FOREIGN PATENT DOCUMENTS

EP    0 971 515    9/2004

(Continued)

OTHER PUBLICATIONS

Timothy M. Schmidt et al., Robust Frequency and Timing Synchronization for OFDM, IEEE Transactions on Communications, vol. 45, No. 12, Dec. 1997.

(Continued)

*Primary Examiner* — Andrew Lee
(74) *Attorney, Agent, or Firm* — The Farrell Law Firm, P.C.

(57) ABSTRACT

A ranging apparatus in a communication system is provided. A terminal generates a ranging code for ranging with a base station, maps the ranging code to at least one sub-carrier so the ranging code is repeated in a time domain, generates a ranging signal so the mapped ranging code has a size of one symbol interval, and transmits the generated ranging signal to the base station. The base station receives a ranging signal, extracts a half signal of a valid symbol interval of the ranging signal, generates a valid symbol interval signal by repeating the extracted half signal of the valid symbol interval, restores a ranging signal using the valid symbol interval signal, and performs ranging using the ranging signal.

39 Claims, 11 Drawing Sheets

U.S. PATENT DOCUMENTS

| | | | |
|---|---|---|---|
| 2005/0135230 A1* | 6/2005 | Yu et al. | 370/210 |
| 2005/0141474 A1* | 6/2005 | Lee et al. | 370/343 |
| 2006/0098749 A1* | 5/2006 | Sung et al. | 375/260 |
| 2007/0058524 A1* | 3/2007 | Modlin et al. | 370/208 |
| 2007/0076589 A1* | 4/2007 | Stopler et al. | 370/210 |
| 2010/0111017 A1* | 5/2010 | Um et al. | 370/329 |

FOREIGN PATENT DOCUMENTS

| | | |
|---|---|---|
| KR | 1020030084243 | 11/2003 |
| KR | 1020050014319 | 2/2005 |
| KR | 1020050015119 | 2/2005 |
| KR | 1020050025897 | 3/2005 |
| KR | 1020050089709 | 9/2005 |
| KR | 1020060046677 | 5/2006 |

OTHER PUBLICATIONS

Hyoungsoo Lim et al., Short Initial Transmission for IEEE 802.16 OFDMA, IEEE 802.16 Broadband Wireless Access Working Group, Sep. 11, 2003.

IEEE Standard for Local and Metropolitan Area Network, Part 16: Air Interface for Fixed Broadband Wireless Access Systems, Jun. 24, 2004, pp. 576-587.

* cited by examiner

APPARATUS AND METHOD FOR PERFORMING RANGING IN A COMMUNICATION SYSTEM

PRIORITY

This application claims the benefit under 35 U.S.C. §119 (a) of an application filed in the Korean Intellectual Property Office on Sep. 2, 2005 and assigned Serial No. 2005-81673, and an application filed in the Korean Intellectual Property Office on Nov. 30, 2005 and assigned Serial No. 2005-116015, the entire contents of both of which are incorporated herein by reference.

BACKGROUND OF THE INVENTION

1. Field of the Invention

The present invention relates generally to a communication system, and in particular, to an apparatus and method for performing ranging in a communication system.

2. Description of the Related Art

In the $4^{th}$ generation (4G) communication system which is the next generation communication system, active research is being conducted to provide services having various Qualities of Service (QoS) to users at a data rate of about 100 Mbps. Particularly, the current 4G communication system positively considers a communication system that uses an Orthogonal Frequency Division Multiplexing (OFDM) scheme and an Orthogonal Frequency Division Multiplex Access (OFDMA) scheme in order to support broadband high-speed transmission.

The OFDMA communication system needs a ranging procedure for matching an accurate time offset and adjusting power, between a transmitter and a receiver, for example, between a base station and a terminal. The ranging can be classified into three types: initial ranging, bandwidth request ranging, and periodic ranging.

Initial ranging is performed at the request of a terminal in order for the terminal to acquire synchronization with a base station. Initial ranging is performed to match an accurate time offset and adjust transmission power between the terminal and the base station.

Periodic ranging is periodically performed by a terminal to adjust a channel state with a base station after adjusting the time offset and transmission power with the base station through the initial ranging.

Bandwidth request ranging is performed by a terminal to request allocation of a bandwidth to perform actual communication with a base station after adjusting the time offset and transmission power with the base station through the initial ranging.

To perform the initial ranging procedure, the terminal transmits an arbitrarily selected ranging code to the base station. The initial ranging procedure will be described hereinbelow with reference to FIG. 1.

Figure 1:
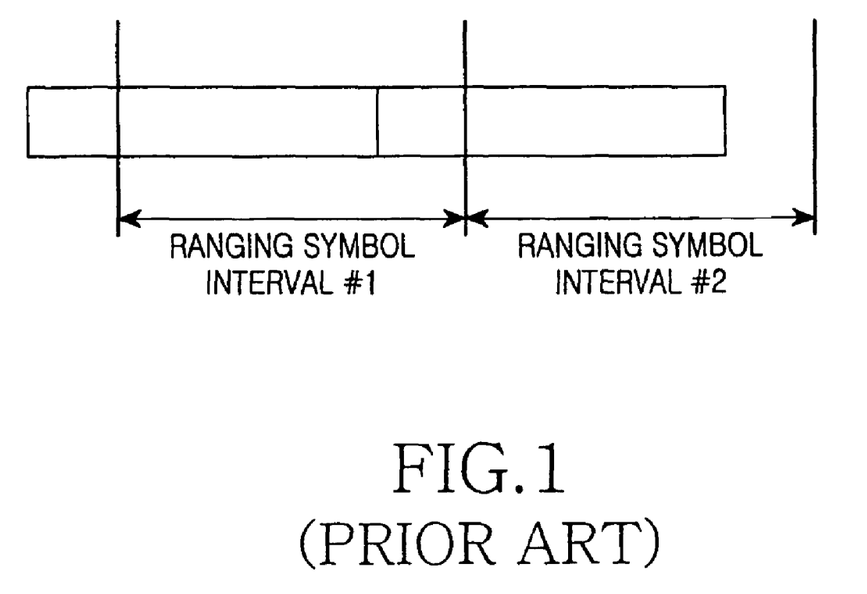
FIG. 1 is a diagram illustrating a ranging signal received in a ranging symbol interval of a base station in a general communication system.

FIG. 1 shows a ranging signal received in a ranging symbol interval of a base station in a general communication system. Before a description of FIG. 1 is given, a description will be made of a TDD/OFDMA communication system that uses a Time Division Duplexing (TDD) scheme as a duplexing scheme, and an OFDMA scheme as a multiple access scheme, by way of example. In this communication system, the initial ranging is performed to acquire synchronization between the base station and the terminal in the state where uplink/downlink synchronization is not secured. However, when the ranging signal transmitted by the terminal of the communication system arrives in a ranging symbol interval of the base station, a synchronization error corresponding to a length of the Cyclic Prefix/Postfix (CP) inserted as a kind of a guard interval may occur in the ranging symbol interval.

When the synchronization error occurs between the base station and the terminal, the ranging signal cannot be restored. In addition, the ranging signal departing from the ranging symbol interval functions as an Inter-Symbol Interference (ISI) for the data signal that will arrive in the next symbol interval, deteriorating the system performance. Therefore, in the communication system, the terminal extends the ranging signal to a length of two symbols, for example, a length of two OFDM symbols (OFDMA symbols) in such a manner that phases thereof should be consecutive to each other, and then transmits the extended ranging signal so the ranging signal should always arrive before a start point of the ranging symbol interval.

Referring to FIG. 1, there are shown a first ranging symbol interval and a second ranging symbol interval of the base station, and each of the ranging symbol intervals corresponds to, for example, a size of one OFDM symbol. In addition, the ranging symbol interval includes a CP.

A ranging signal is shown that is transmitted by the terminal to the base station for ranging. Two OFDM symbols transmitted from the terminal through an uplink are allocated as the ranging signal, and the ranging signal is composed of two phase-consecutive OFDM symbols. The terminal transmits the ranging signal so the ranging signal should always arrive before the start point of the ranging symbol interval of the base station. That is, the terminal transmits the ranging signal so the ranging signal should always arrive before a start point the first ranging symbol interval. It does not matter because an interval given before the first ranging symbol interval starts is a guard interval.

The ranging signal received at the base station in this way is composed of two in-phase OFDM symbols obtained by repeating a ranging signal of a 1-OFDM symbol length. Therefore, the ranging signal arriving in the first ranging symbol interval is a ranging signal obtained by cyclic-shifting the ranging signal of a 1-OFDM symbol length. The base station estimates a time offset using the ranging signal received in the first ranging symbol interval.

A signal received in the second ranging symbol interval cannot be restored because it cannot have a 1-OFDM symbol length. In addition, since the signal received in the second ranging symbol interval serves as interference over the full band, it is not used.

As a result, when the foregoing ranging procedure is performed between the base station and the terminal, the ranging signal received in the second ranging symbol interval simply functions as a guard interval for ranging, thereby causing an unnecessary resource waste due to the ranging signal received in the second ranging symbol interval.

SUMMARY OF THE INVENTION

It is, therefore, an object of the present invention to provide a ranging system and method in a communication system.

It is another object of the present invention to provide an initial ranging system and method in a communication system.

It is further another object of the present invention to provide a ranging system and method for increasing resource efficiency in a communication system.

According to one aspect of the present invention, there is provided a ranging method of a terminal in a communication system. The method includes generating a ranging code for ranging with a base station, and mapping the ranging code to at least one sub-carrier so the ranging code is repeated in a time domain; and generating a ranging signal so the mapped ranging code has a size of one symbol interval, and transmitting the generated ranging signal to the base station.

According to another aspect of the present invention, there is provided a ranging method of a base station in a communication system. The method includes receiving a ranging signal, and extracting a half signal of a valid symbol interval of the ranging signal; generating a valid symbol interval signal by repeating the extracted half signal of the valid symbol interval; and restoring a ranging signal using the valid symbol interval signal, and performing ranging using the ranging signal.

According to further another aspect of the present invention, there is provided a ranging apparatus of in a communication system. The apparatus includes a terminal for generating a ranging code for ranging with a base station, mapping the ranging code to at least one sub-carrier so the ranging code is repeated in a time domain, generating a ranging signal so the mapped ranging code has a size of one symbol interval, and transmitting the generated ranging signal to the base station.

According to yet another aspect of the present invention, there is provided a ranging apparatus in a communication system. The apparatus includes a base station for receiving a ranging signal, extracting a half signal of a valid symbol interval of the ranging signal, generating a valid symbol interval signal by repeating the extracted half signal of the valid symbol interval, restoring a ranging signal using the valid symbol interval signal, and performing ranging using the ranging signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides a system and method for performing ranging, in particular, initial ranging in a communication system. In addition, the present invention provides a system and method for performing initial ranging using one ranging symbol interval, and also performing data transmission/reception through the ranging symbol interval. In order to reduce the resources used for the existing initial ranging, a terminal generates a ranging signal of an interval having a size of one Orthogonal Frequency Division Multiplexing (OFDM) or Orthogonal Frequency Division Multiplex Access (OFDMA) symbol, i.e. having a size of a ranging symbol interval, and performs initial ranging with a base station using the generated ranging signal. The ranging signal is composed of repeated signals having the same pattern. The base station restores the ranging signal by extracting a half, i.e. ½, thereof in a valid symbol interval of the ranging signal, and performs initial ranging with each terminal using the restored ranging signal. In addition, the terminal performs data communication through the ranging symbol interval of the base station. That is, the base station performs initial ranging through the ranging symbol interval, and performs data communication through the remaining ranging symbol interval unused for the initial ranging.

For convenience, it will be assumed herein that the communication system to which the present invention is applicable is a TDD/OFDMA communication system that uses a Time Division Duplexing (TDD) scheme as a duplexing scheme, and an Orthogonal Frequency Division Multiple Access (OFDMA) scheme as a multiple access scheme. In addition, the initial ranging system and method provided by the present invention is not limited to the TDD/OFDMA communication system, but can be applied to other communication systems as well as the TDD/OFDMA communication system.

Figure 2:
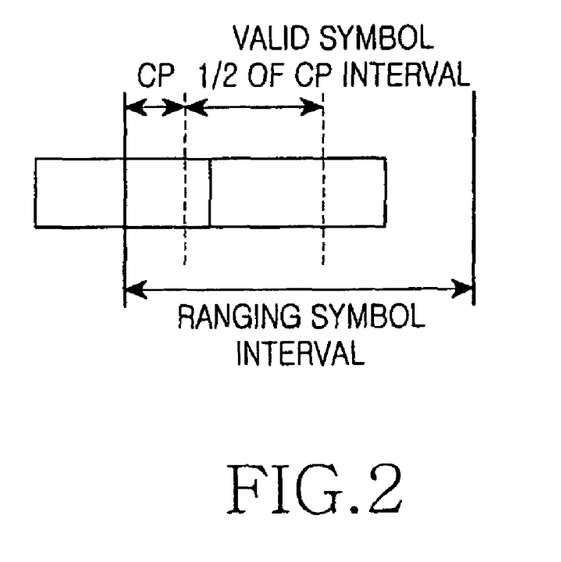
FIG. 2 is a diagram illustrating a ranging signal received in a ranging symbol interval of a base station in a communication system according to the present invention.

FIG. 2 shows a ranging signal received in a ranging symbol interval of a base station in a communication system according to the present invention. A ranging signal with one ranging symbol interval of a base station is received at the base station. The received ranging signal appears in the ranging symbol interval. A first OFDM (OFDMA) symbol of an uplink transmission signal will be allocated as the ranging signal by a terminal. Therefore, the terminal arbitrarily selects one of ranging codes used by the terminal, and maps the selected ranging code to at least one even sub-carrier. The terminal generates a transmission signal, i.e. ranging signal, by performing Inverse Fast Fourier Transform (IFFT) on the ranging code mapped to the sub-carrier. As the terminal maps the ranging code to the even sub-carrier in this way, the ranging signal transmitted by the terminal is transmitted in such a way that the same pattern is repeated twice in one OFDM symbol interval. The ranging signal used for ranging uses one OFDM symbol instead of using the existing two OFDM symbols. The ranging symbol interval has the same size as the one OFDM symbol size.

Therefore, the terminal transmits a signal so the ranging signal arrives a maximum of ½ and a minimum of 0 of the ranging signal (one OFDM symbol) ahead of a start point of a ranging symbol interval of a receiver. In other words, the terminal transmits a signal so at least ½ of the full ranging signal should be received after of the start point of the ranging symbol interval. As a result, at least ½ of a valid symbol interval of the ranging signal always arrives in the ranging interval. The base station can receive the ranging signal, and perform ranging using the received ranging signal.

Figure 3:
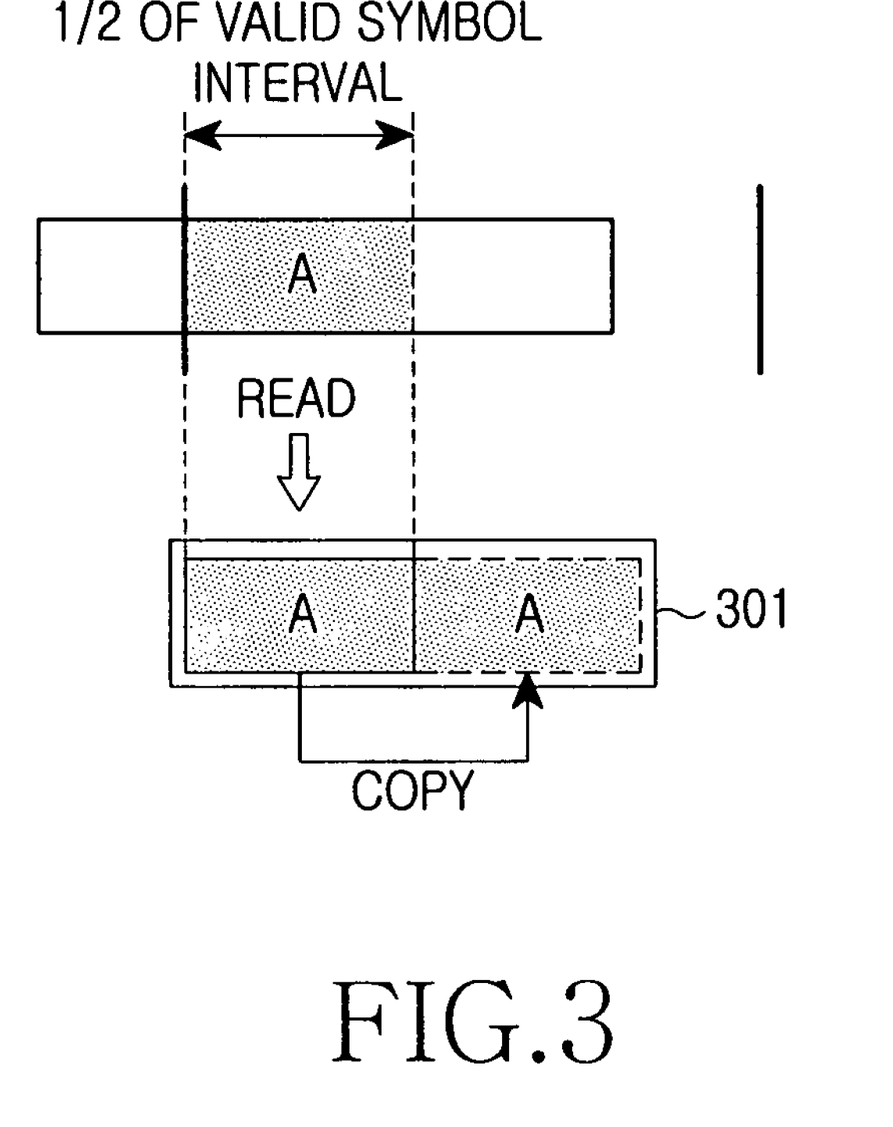
FIG. 3 is a diagram illustrating a method for detecting a ranging signal in a communication system according to the present invention.

FIG. 3 shows a method for detecting a ranging signal in a communication system according to the present invention. A ranging signal is shown that is received in a ranging symbol interval of the base station. As the terminal transmits the ranging signal so at least ½ of a valid symbol interval is received based on the start point of the ranging symbol interval, the base station detects ½ (A) of the valid symbol interval from the ranging signal received in the ranging symbol interval. Because the ranging signal has a format where the same pattern is repeated in the time domain, it can be restored through the repetition. In other words, one valid OFDM symbol 301 is generated by repeating ½ (A) of the valid symbol interval extracted by the base station.

The operation of generating the valid OFDM symbol 301 is an operation before inputting to a Fast Fourier Transform (FFT) unit. The generated valid OFDM symbol 301 is input to the FFT unit for FFT conversion in the base station, and the FFT unit restores the ranging signal. The valid OFDM symbol is a signal including valid ranging signals except for the Cyclic Prefix/Postfix (CP) in the ranging signal.

Figure 4:
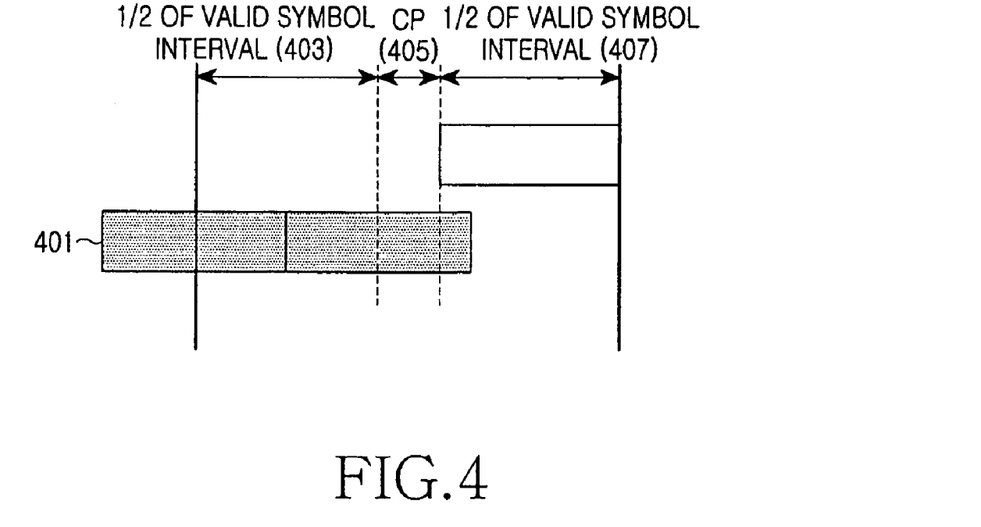
FIG. 4 is a diagram illustrating a data signal received in a ranging symbol interval of a base station in a communication system according to the present invention.

FIG. 4 shows a data signal received in a ranging symbol interval of a base station in a communication system according to the present invention. A data signal is shown that is received at the base station. One ranging symbol interval of the base station is also shown. The ranging symbol interval includes two intervals 403 and 407, each of which is ½ of a valid symbol interval, and also includes a CP interval 405. The base station can receive data through the second ½ interval 407 of a valid symbol interval among the two ½ intervals of a valid symbol interval. With the use of the first ½ interval 403 of a valid symbol interval, synchronization acquisition is performed between the terminal and the base station through the initial ranging operation as described above.

Alternatively, it is also possible acquire synchronization using the first ½ interval 407 of a valid symbol interval, and perform data communication using the second ½ interval 407 of a valid symbol interval. If the terminal acquires synchronization with the base station through the initial ranging, it receives allocation information related to allocation of the second ½ interval 407 of a valid symbol interval, from the base station.

If the terminal is allocated the second ½ interval 407 of a valid symbol interval from the base station, the terminal maps data to at least one odd sub-carrier. The terminal performs IFFT on the data mapped to the sub-carrier, thereby generating a transmission signal, i.e. a data signal. As the terminal maps a ranging code to the odd sub-carrier in this manner, the ranging signal transmitted by the terminal is transmitted so the same patterns having different signs are repeated twice in one OFDM symbol interval. In addition, the terminal extracts a signal corresponding to a ½ interval of a valid symbol interval from the generated data signal. The terminal generates a transmission signal, i.e. data signal, by nulling a signal of the leading ½ interval of the full valid symbol interval, and performing IFFT on the nulled data symbol. The terminal matches the nulled data signal before transmission, so it is received in the second ½ interval 407 of a valid symbol interval. As a result, the non-nulled data signal is received before an end point of the ranging symbol interval. Then the base station can receive the data signal.

Figure 5:
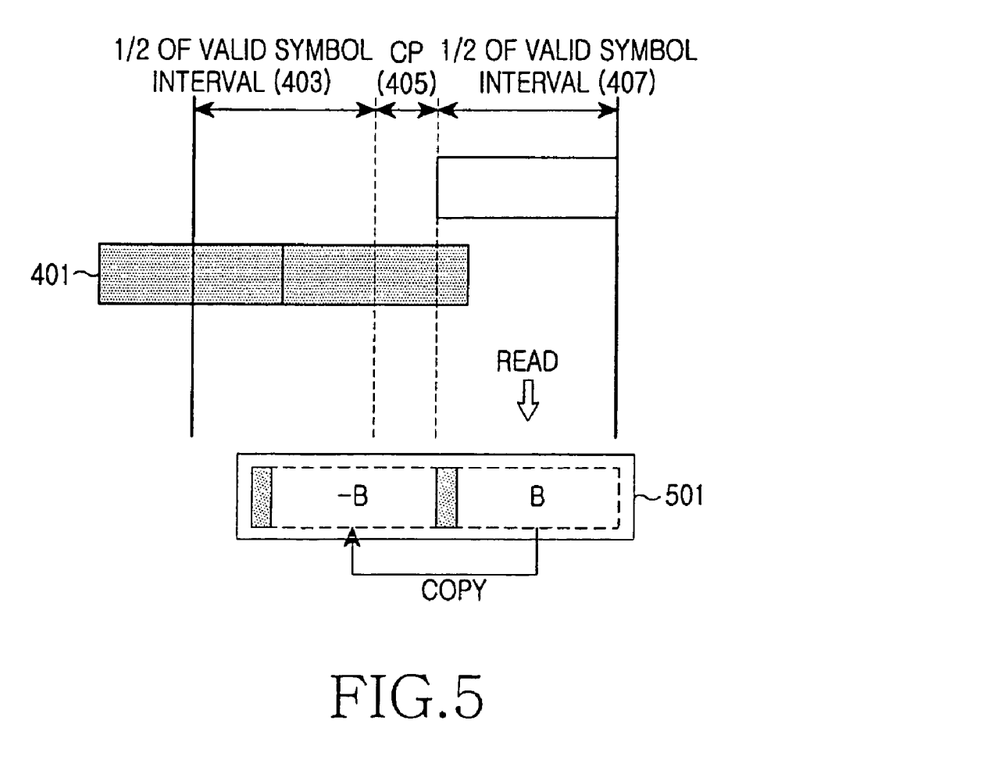
FIG. 5 is a diagram illustrating a method for detecting a data signal in a communication system according to the present invention.

FIG. 5 shows a method for detecting a data signal in a communication system according to the present invention. A data signal is shown that is received in a ranging symbol interval of the base station. The terminal transmits the data signal so the data signal should be received before the end-point of the ranging symbol interval. In other words, as the terminal transmits the data signal so it should be received in the second ½ interval of a valid symbol interval, the base station detects ½ (B) of a valid symbol interval through the data signal received in the ranging symbol interval. With the use of the ½ of the valid symbol interval of the data symbol, detected by the base station, it is possible to restore the data signal that the terminal transmitted after inverting the sign and repeatedly inserting the inverted signal in front of the received signal. The operation of restoring the data symbol is also an operation before inputting to the FFT unit.

Figure 6:
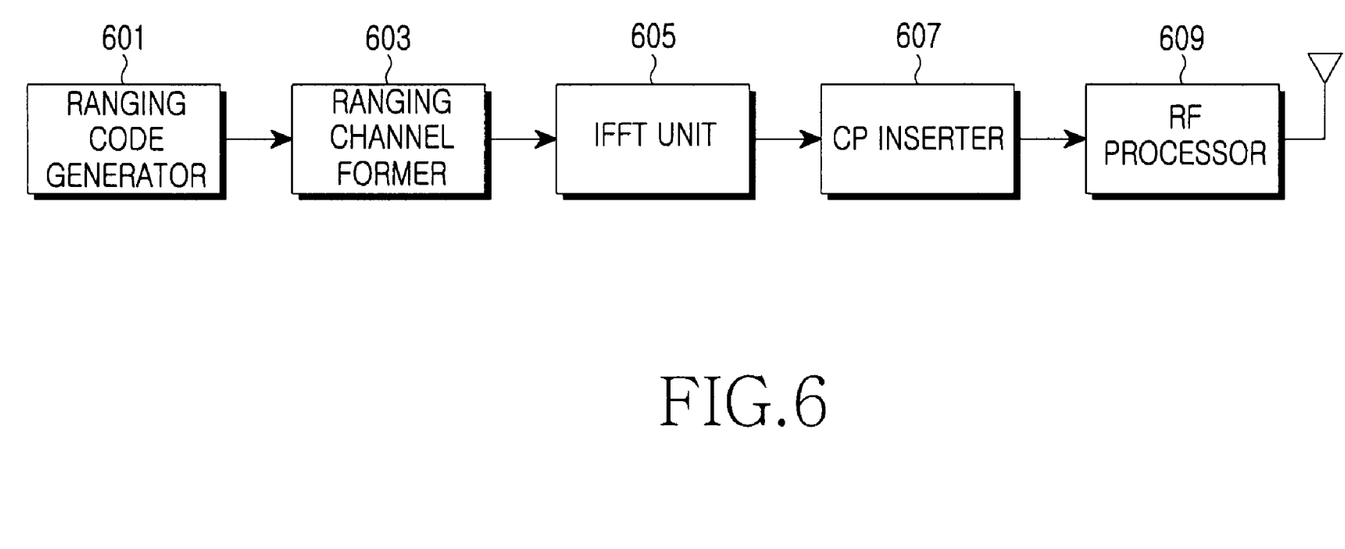
FIG. 6 is a diagram illustrating a structure of a terminal for transmitting a ranging signal according to the present invention.

With reference to FIG. 6, a description will now be made of a structure of a terminal for generating a ranging signal where the same pattern is repeated twice in one OFDM symbol interval, i.e. a ranging symbol interval, and transmitting the generated ranging signal according to the present invention.

FIG. 6 shows a terminal for transmitting a ranging signal according to the present invention. The terminal includes a ranging code generator 601, a ranging channel former 603, an IFFT unit 605, a CP inserter 607, and a Radio Frequency (RF) processor 609.

The ranging code generator 601 generates ranging codes for ranging, and outputs the generated ranging codes to the ranging channel former 603.

The ranging channel former 603 forms a ranging channel using the ranging codes output from the ranging code generator 601, and outputs the formed ranging channel to the IFFT unit 605. The ranging channel used for a ranging signal. The ranging channel former 603 selects an arbitrary code from a set of initial ranging codes for ranging, especially for initial ranging, and maps the selected code to at least one even sub-carrier. That is, the ranging channel former 603 forms a ranging channel by mapping the ranging code to a ranging channel composed of the even sub-carriers.

The IFFT unit 605 performs IFFT on the output signal of the ranging channel former 603, and outputs the IFFT-processed signal to the CP inserter 607. If the ranging channel to which the ranging code is mapped undergoes IFFT, a base-band signal having a format where the same pattern is repeated in the time domain is generated.

The CP inserter 607 inserts a CP in the baseband signal, and outputs the CP-inserted signal to the RF processor 609. The CP is inserted to remove interference between transmission OFDM symbols, and the CP inserter 607 copies specific samples of an OFDM symbol in the time domain and inserts the copied samples in a valid OFDM symbol.

The RF processor 609, including a filter and a front-end unit, RF-processes the output signal of the CP inserter 607 so it can be actually transmitted over the air, and then transmits the RF-processed signal over the air via an antenna.

Figure 7:
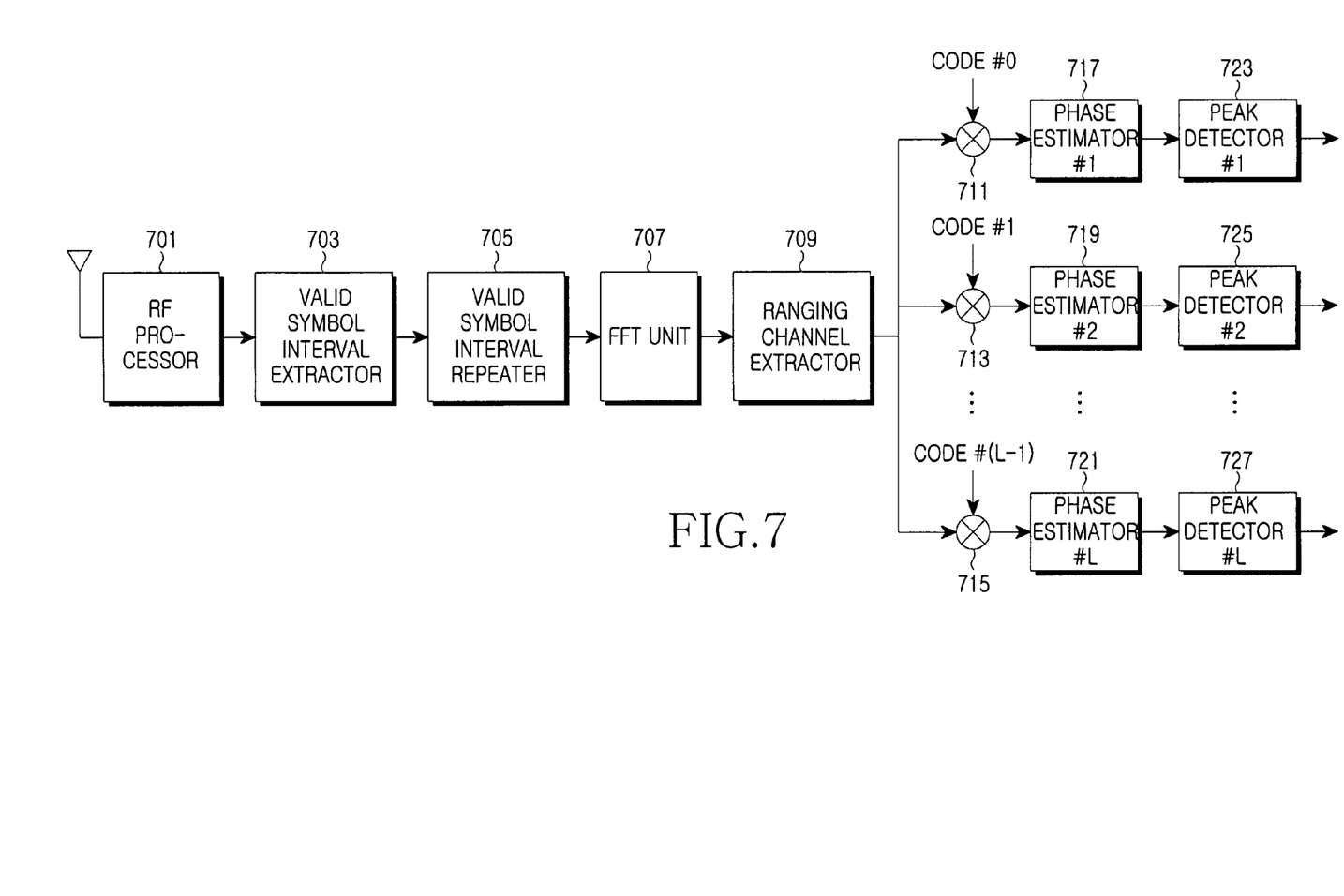
FIG. 7 is a diagram illustrating a structure of a base station for receiving a ranging signal according to the present invention.

FIG. 7 shows a base station for receiving a ranging signal according to an embodiment of the present invention. The base station includes an RF processor 701, a valid symbol interval extractor 703, a valid symbol interval repeater 705, an FFT unit 707, a ranging channel extractor 709, a plurality of multipliers 711, 713 and 715, a plurality of phase estimators 717, 719 and 721, and a plurality of peak detectors 723, 725 and 727.

The RF processor 701 receives the signal transmitted by the terminal via an antenna, converts the received signal into a baseband signal, and outputs the baseband signal to the valid symbol interval extractor 703.

The valid symbol interval extractor 703 extracts a signal corresponding to ½ of a valid symbol interval from the received signal, i.e. ranging signal, based on of a start point of the ranging symbol interval, and outputs the extracted signal to the valid symbol interval repeater 705. The valid symbol interval extractor 703 extracts a signal corresponding to ½ of a valid symbol interval beginning at the start point of the ranging symbol interval.

The valid symbol interval repeater 705 restores a signal having a size of the valid symbol interval by repeating the signal output from the valid symbol interval extractor 703, and outputs the restored signal to the FFT unit 707. The valid symbol interval repeater 705 restores the ranging signal by generating the same signal as the signal corresponding to ½ of the valid symbol interval.

The FFT unit 707 performs FFT on the restored signal having a size of the valid symbol interval, and outputs the FFT-processed signal to the ranging channel extractor 709.

The ranging channel extractor 709 extracts a ranging signal from the FFT-processed signal having the size of the valid symbol interval, and outputs the extracted ranging signal to the plurality of multipliers 711, 713 and 715.

The extracted ranging signal is expressed as Equation (1):

$$Y(k) = \sum_i H_i(k) X_i(k) \exp(j2\pi n_i k / N) + W(k) \quad (1)$$

Referring to Equation (1), k denotes an element a ranging channel as a sub-carrier index, $Y(k)$ denotes a received signal, and $H_i(k)$ denotes a channel of a user using a code i. In addition, $X_i(k)$ is a code of a user using a code i, and has a value of +1 or −1. Further, $n_i$ denotes a time offset of a user using a code i, $W(k)$ denotes a noise, and N denotes a size of FFT.

The ranging channel extractor 709 extracts the ranging signal of Equation (1). The multipliers 711, 713 and 715 multiply the ranging signal by L ranging codes, for example, a ranging code #0 to a ranging code #(L-1), and then output their results to the phase estimators 717, 719 and 721, respectively. For example, it will be considered that a time offset $n_0$ of a user, or a terminal, using the ranging code #0 is estimated. In this case, in order to estimate the time offset $n_0$ of the user using the code #0, the multiplier 711 multiplies the ranging signal extracted by the ranging channel extractor 709 by the code #0, i.e. the code $X_0(k)$ of the user. The output signal of the first multiplier 711 that multiplies the ranging signal by the user code $X_0(k)$ is represented by Equation (2):

$$Y(k)X_0(k) = H_0(k)\exp(j2\pi n_0 k/N) + \sum_{i \neq 0} H_i(k) X_i(k) X_0(k) \exp(j2\pi n_i k / N) + W(k) X_0(k) \quad (2)$$

The output signal of the first multiplier 711, shown in Equation (2), is input to the first phase estimator 717, and the first phase estimator 717 performs phase estimation using the output signal of the first multiplier 711. An equation for the phase estimation is given as Equation (3):

$$\sum_{k \in RACH} Y(k) X_0(k) \exp(-j2\pi nk/N) = \quad (3)$$
$$\sum_{k \in RACH} H_0(k) \exp(j2\pi n_0 k/N) \exp(-j2\pi nk/N) +$$
$$\sum_{k \in RACH} \sum_{i \neq 0} H_i(k) X_i(k) X_0(k) \exp(j2\pi n_i k/N) \exp(-j2\pi nk/N) +$$
$$\sum_{k \in RACH} W(k) X_0(k) \exp(-j2\pi nk/N)$$

The phase estimator 717 calculates a phase-estimated value while changing the value n in Equation (3). Herein, RACH denotes a sub-carrier index set of a ranging channel. In addition, $$\sum_{k \in RACH} \sum_{i \neq 0} H_i(k) X_i(k) X_0(k) \exp(j2\pi n_i k/N) \exp(-j2\pi nk/N)$$

of

Equation (3) has a value closely approximating the zero (0) due to the cross correlation characteristics between the codes, and $$\sum_{k \in RACH} W(k) X_0(k) \exp(-j2\pi nk/N)$$

serves as the noise.

The left side of Equation (3) has a peak value when $n=n_0$. Therefore, the peak detector 723 detects the value n at the instant when the peak occurs, among the phase-estimated values that vary according to the value n of the phase estimator 717. Accordingly, the peak detector 723 determines the value n at the instant when the peak occurs, as the $n_0$. In addition, the peak detector 723 calculates a ratio of the phase-estimated peak value to the phase-estimated average value of Equation (3), for example, a Peak-to-Average Ratio (PAR). If the PAR is less than or equal to a predetermined threshold, the peak detector 723 does not use the value $n_0$, determining that no ranging code is received. However, if the PAR exceeds the threshold, the peak detector 723 estimates the time offset and outputs the ranging code.

Then the base station transmits a ranging response message to the terminal, and upon receipt of the ranging response message, the terminal adjusts a time offset and transmission power with the base station.

Figure 8:
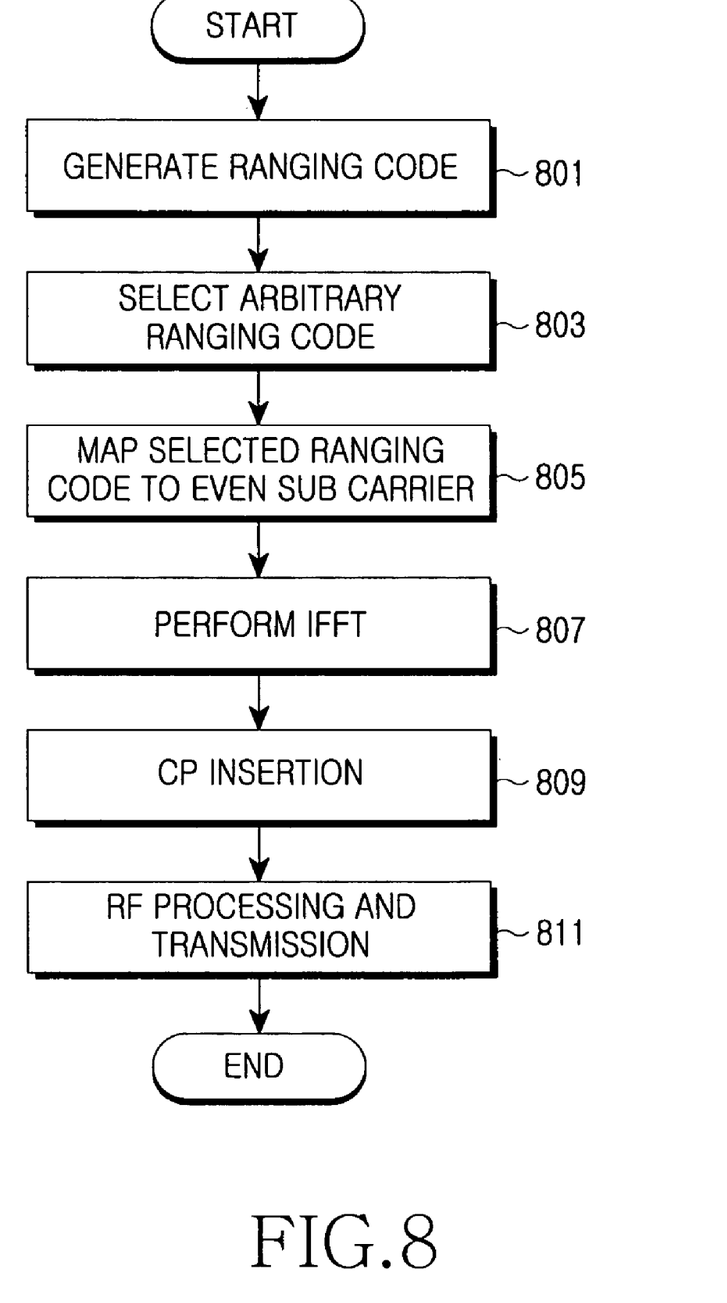
FIG. 8 is a flowchart illustrating a transmission process of transmitting a ranging signal according to the present invention.

FIG. 8 shows a transmission process of transmitting a ranging signal according to the present invention. A terminal generates a ranging code in step 801. Thereafter, in step 803, the terminal selects an arbitrary code for initial ranging among the ranging codes.

In step 805, the terminal forms a ranging channel by mapping the ranging code to a ranging channel composed of at least one even sub-carrier. In step 807, the terminal performs IFFT on the ranging codes mapped to the ranging channel composed of the even sub-carrier.

In step 809, the terminal inserts a CP in the IFFT-processed baseband signal where the same pattern is repeated in the time domain. In step 811, the terminal RF-processes the CP-inserted baseband signal.

Figure 9:
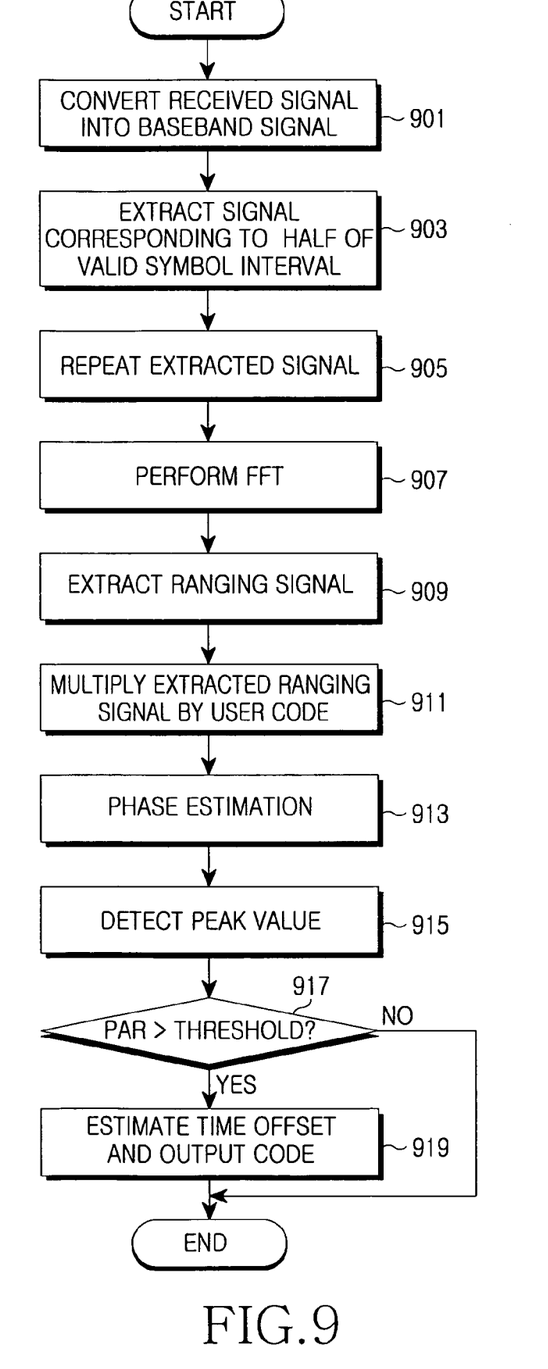
FIG. 9 is a flowchart illustrating a reception process of receiving a ranging signal according to the present invention.

FIG. 9 shows a reception process of receiving a ranging signal according to the present invention. In step 901, a base station receives a signal transmitted by the transmitter, and converts the received signal into a baseband signal. In step 903, the base station extracts, from the baseband signal, a signal corresponding to ½ of a valid symbol interval of a ranging signal beginning at a start point of a ranging symbol interval.

In step 905, the base station restores a valid symbol interval of the ranging signal transmitted by the transmitter, by repeating the extracted signal. In step 907, the base station performs FFT on the signal having a size of the valid symbol interval.

In step 909, the base station extracts a ranging signal using the FFT-processed signal. In step 911, the base station multiplies the extracted ranging signal by user codes.

In step 913, the base station performs phase estimation. The phase estimation process has been described in detail with reference to FIG. 7, so a detailed description thereof will be omitted.

In step 915, the base station detects a peak value where the phase-estimated value is maximized for the terminals that use their unique codes, as a result of the phase estimation.

In step 917, the base station calculates a ratio of the peak to an average output, i.e. PAR, and determines whether the PAR exceeds a predetermined threshold. If the PAR exceeds the threshold, the base station proceeds to step 919 where it estimates a time offset and outputs the ranging code. As a result, the base station transmits ranging success information indicating the success in receipt of the ranging signal, for example, a ranging response message including an OFDMA symbol number, a sub-channel and a ranging code, to the corresponding transmitter, i.e. the terminal. Next, with reference to FIG. 10, a description will be made of a terminal for transmitting the data signal.

Figure 10:
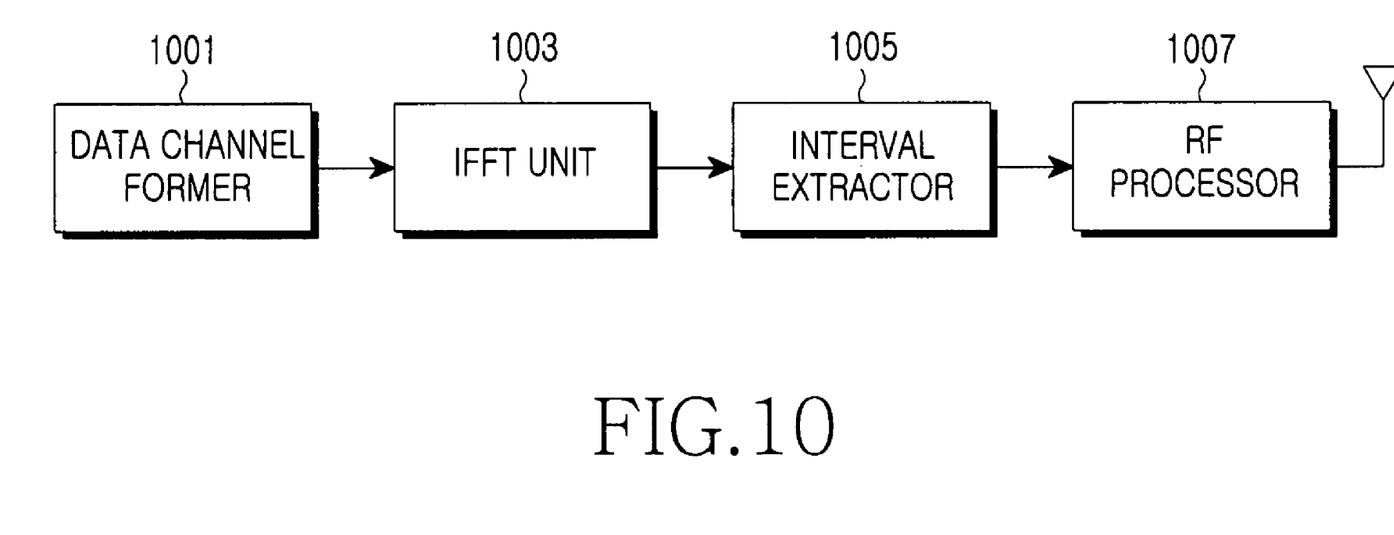
FIG. 10 is a diagram illustrating a structure of a terminal for transmitting a data signal according to the present invention.

FIG. 10 shows a terminal for transmitting a data signal according to the present invention. The terminal includes a data channel former 1001, an IFFT unit 1003, an interval extractor 1005, and an RF processor 1007.

The data channel former 1001 forms a data channel by mapping a received data symbol to an odd sub-carrier, and outputs the formed data channel to the IFFT unit 1003.

The IFFT unit 1003 performs IFFT on the data channel signal output from the data channel former 1001, and outputs the IFFT-processed signal to the interval extractor 1005. The signal output from the IFFT unit 1003 has a format in which the same patterns having the opposite signs are repeated at periods of ½ of a valid symbol interval of the data signal. The interval extractor 1005 receives the signal output from the IFFT unit 1003, performs nulling on a leading part thereof corresponding to ½ of a valid symbol interval to extract only the rear part corresponding to ½ of the valid symbol interval, and outputs the extracted signal to the RF processor 1007. The RF processor 1007 RF-processes the baseband data signal output from the interval extractor 1005 to match synchronization to the second ½ interval of a valid symbol interval of the ranging symbol interval for the base station, and transmits the synchronized signal to the base station. In other words, the RF processor 1007 transmits the data signal so the data signal of the terminal should be received before the end of the ranging symbol interval of the base station.

Figure 11:
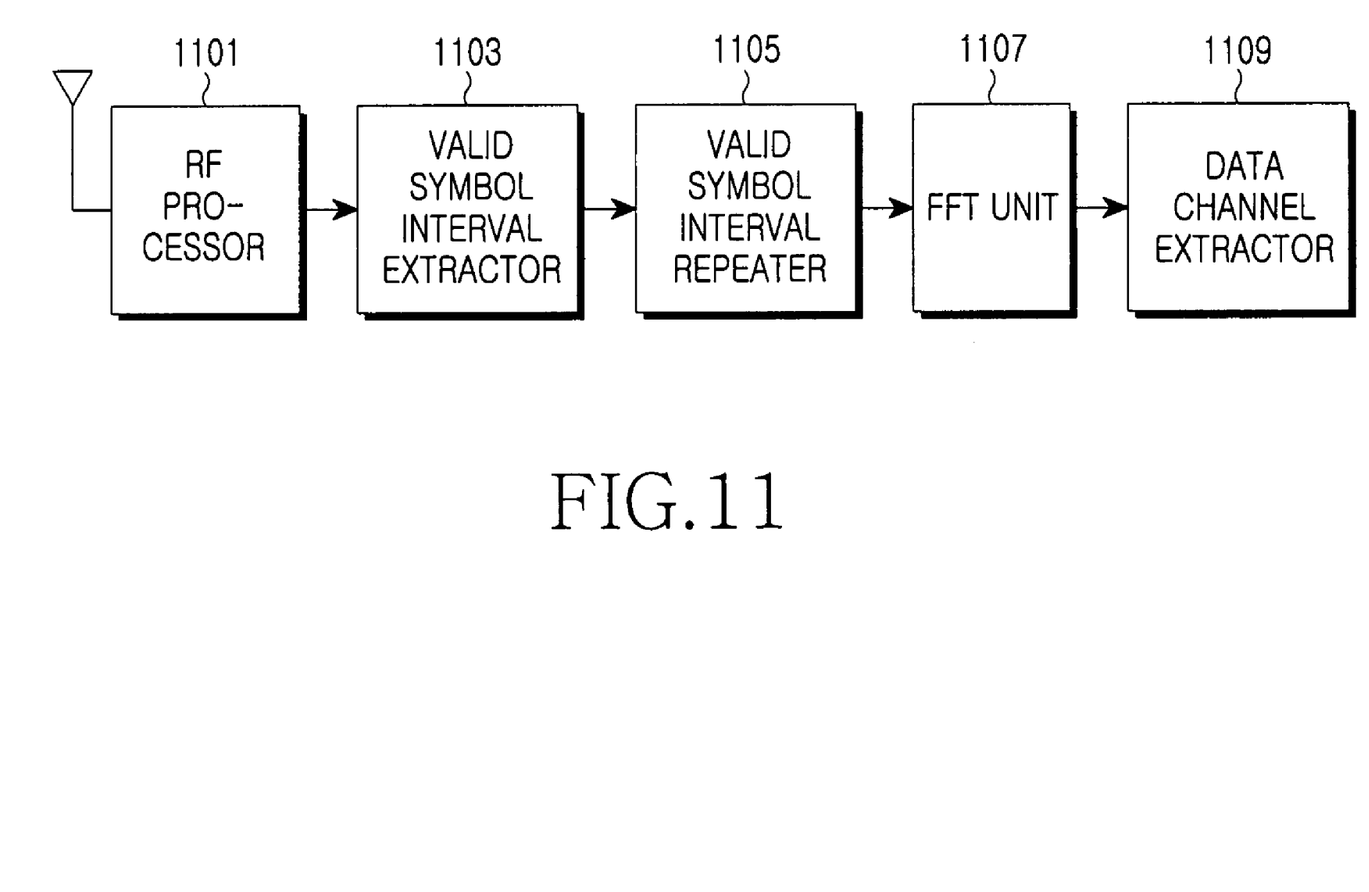
FIG. 11 is a diagram illustrating a structure of a base station for receiving a data signal according to the present invention.

FIG. 11 shows a base station for receiving a data signal according to an embodiment of the present invention. The base station includes an RF processor 1101, a valid symbol interval extractor 1103, a valid symbol interval repeater 1105, an FFT unit 1107, and a data channel extractor 1109.

The RF processor 1101 receives a signal via an antenna, converts the received signal into a baseband signal, and outputs the baseband signal to the valid symbol interval extractor 1103.

The valid symbol interval extractor 1103 extracts only the ½ interval corresponding to the rear part of the valid symbol interval of the data signal from the baseband signal output from the RF processor 1101, and outputs the extracted signal to the valid symbol interval repeater 1105.

The valid symbol interval repeater 1105 generates a signal corresponding to one valid symbol interval by inverting a sign of the corresponding signal, copying the inverted signal, and inserting the copied signal in front of the rear ½ signal of the valid symbol interval, and outputs the generated signal to the FFT unit 1107.

The FFT unit 1107 performs FFT on the signal output from the valid symbol interval repeater 1105, and outputs the FFT-processed signal to the data channel extractor 1109. The data channel extractor 1109 extracts the data mapped to at least one odd sub-carrier from the signal output from the FFT unit 1107.

Figure 12:
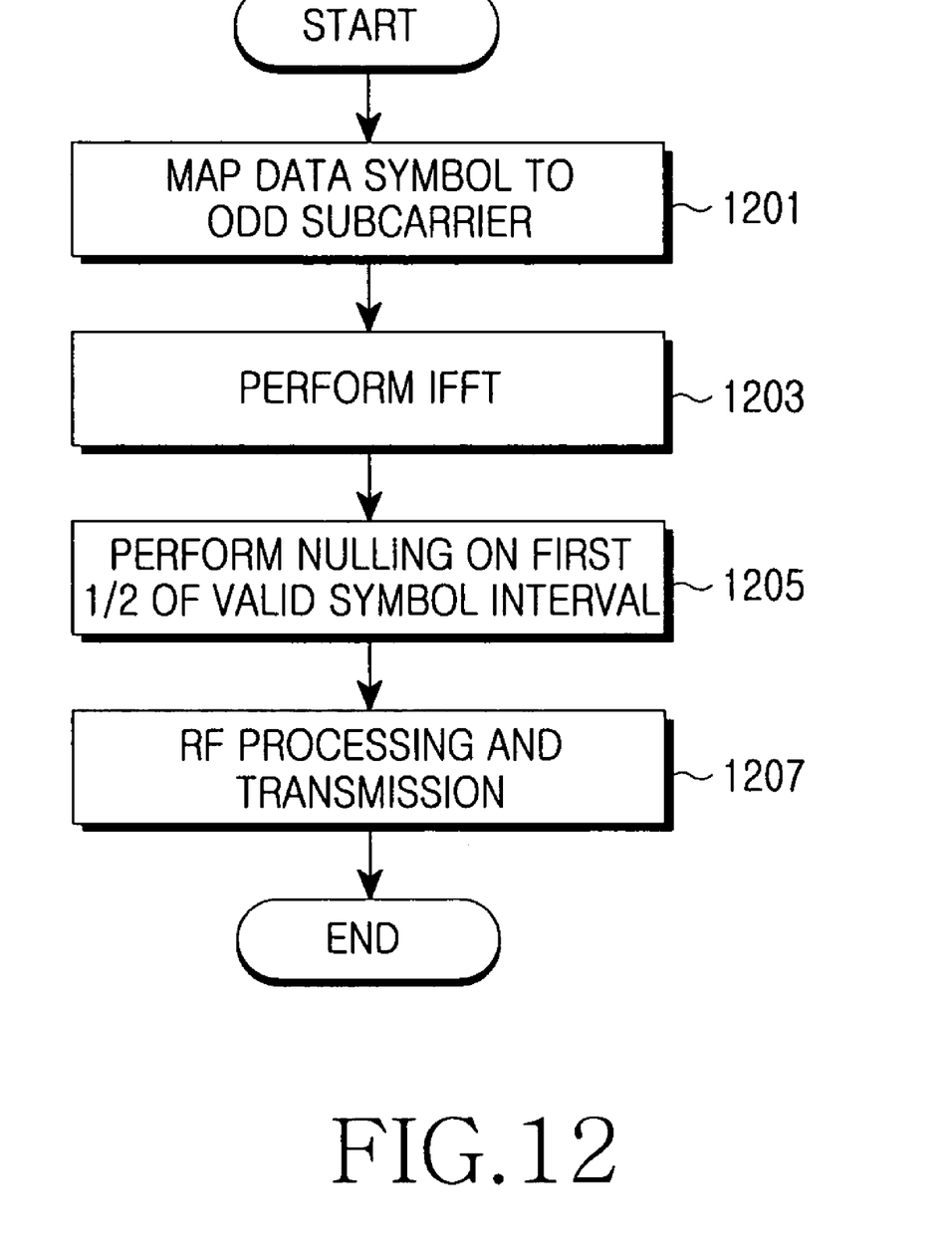
FIG. 12 is a flowchart illustrating a transmission process of transmitting a data signal according to the present invention.

Next, with reference to FIG. 12, a description will be made of an operation of a terminal for transmitting the data signal. FIG. 12 shows a transmission process of transmitting a data signal according to the present invention.

A terminal maps a data symbol to at least one odd sub-carrier in step 1201.

In step 1203, the terminal performs IFFT on the data signal mapped to the odd sub-carrier.

In step 1205, the terminal performs nulling on the leading ½ interval of a valid symbol interval for the IFFT-processed signal, and extracts only the rear ½ interval. In step 1207, the terminal RF-processes the nulled baseband data signal, and transmits the RF-processed signal to a base station.

Figure 13:
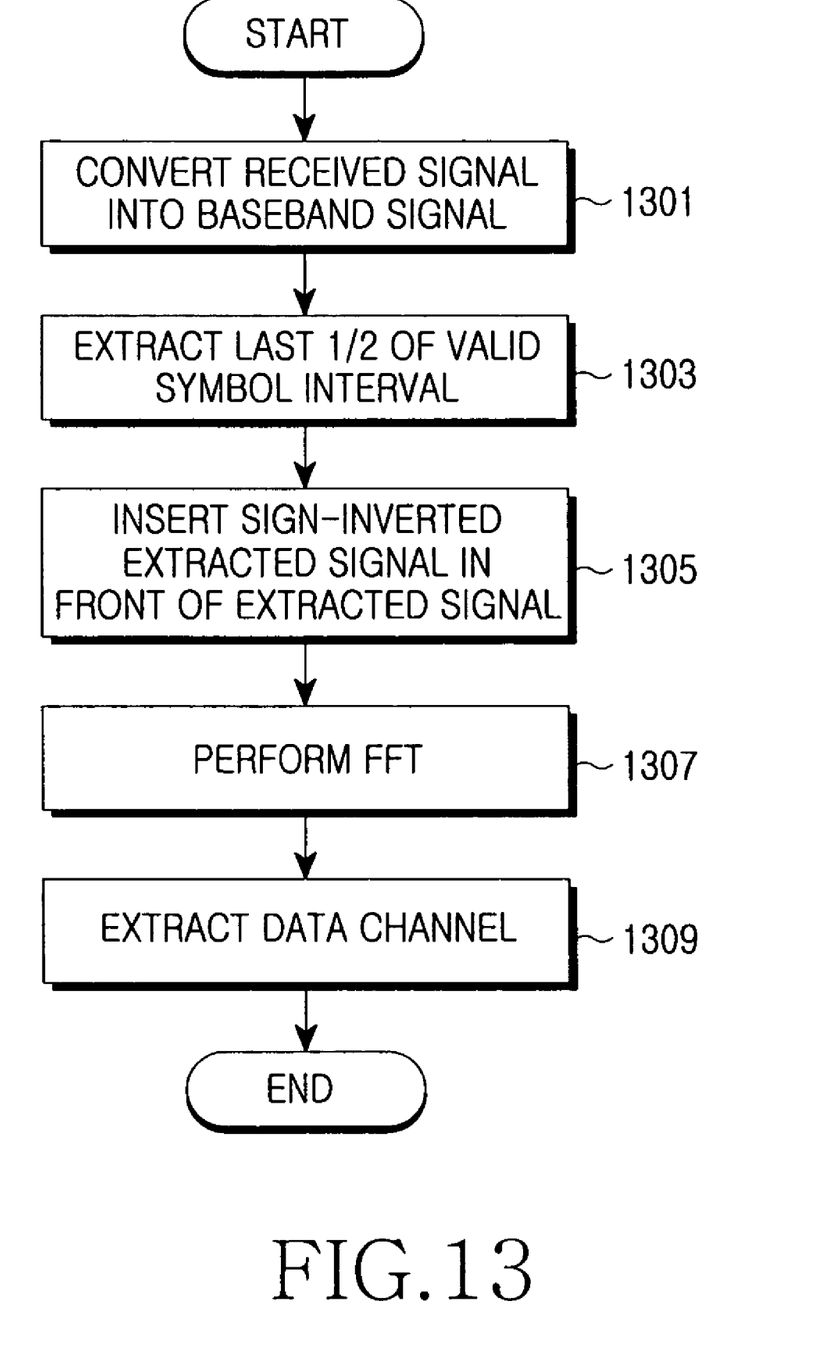
FIG. 13 is a flowchart illustrating a reception process of receiving a data signal according to the present invention.

FIG. 13 shows a reception process of receiving a data signal according to the present invention. A base station receives a signal transmitted by a terminal and converts the received signal into a baseband signal in step 1301.

In step 1303, the base station extracts only the rear ½ of a valid symbol interval of the baseband signal.

In step 1305, the base station generates a signal having a length of one valid symbol interval by copying the corresponding signal, inverting a sign thereof, and inserting the inverted signal in front of the extracted signal.

In step 1307, the base station performs FFT on the completed signal having the length of one valid symbol interval. In step 1309, the base station restores a data symbol mapped to at least one odd sub-carrier of the FFT-processed signal, and then ends the process.

The transmitter/receiver for transmitting/receiving the data symbol, shown in FIGS. 10 and 11, can be included in the transmitter/receiver for performing ranging, shown in FIGS. 6 and 7. Therefore, the base station and the terminal can perform initial ranging through one ranging symbol interval, and can additionally perform data communication through the ranging symbol interval.

As can be understood from the foregoing description, the present invention can perform ranging through one symbol interval in a communication system. Therefore, the present invention can reduce the resources used for the existing initial ranging and perform initial ranging through one symbol interval. In addition, the present invention can perform even the data transmission/reception through the symbol interval. In conclusion, the resources unnecessarily used for the ranging are reduced, contributing to an increase in the efficiency of the total system resources.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A ranging method of a terminal in a communication system, the method comprising the steps of:
generating a ranging code for ranging with a base station, and mapping the ranging code to at least one sub-carrier so the ranging code is repeated in a time domain; and
generating a ranging signal so the mapped ranging code has a size of one symbol interval, and transmitting the generated ranging signal to the base station,
wherein the terminal transmits the ranging signal so at least half of a valid symbol interval of the ranging signal is received after a start point of a ranging symbol interval of the base station.

2. The ranging method of claim 1, wherein the ranging is initial ranging.

3. The ranging method of claim 1, wherein the ranging code is mapped to at least one even sub-carrier.

4. The ranging method of claim 1, wherein the ranging signal has the same size as a size of one ranging symbol interval of the base station.

5. The ranging method of claim 1, wherein the ranging signal is generated by performing Inverse Fast Fourier Transform (IFFT) on the ranging code mapped to the sub-carrier.

6. The ranging method of claim 1, further comprising:
mapping transmission data to at least one sub-carrier so the data signal is repeated upon acquiring synchronization with the base station through the ranging signal;
nulling a predetermined interval in the data signal mapped to the sub-carrier; and
transmitting the data signal to the base station.

7. The ranging method of claim 6, wherein the data signal is mapped to at least odd sub-carrier.

8. The ranging method of claim 6, wherein the predetermined interval is a leading half of a valid symbol interval of the data signal.

9. The ranging method of claim 6, wherein the terminal transmits a data symbol so the data symbol is received before an end point of the ranging symbol interval of the base station.

10. The ranging method of claim 6, wherein the data signal is generated by performing Inverse Fast Fourier Transform (IFFT) on the data mapped to the sub-carrier.

11. A ranging method of a base station in a communication system, the method comprising the steps of:
receiving a ranging signal, and extracting a half signal of a valid symbol interval of the ranging signal;
generating a valid symbol interval signal by repeating the extracted half signal of the valid symbol interval; and
restoring a ranging signal using the valid symbol interval signal, and performing ranging using the ranging signal.

12. The ranging method of claim 11, wherein the ranging is initial ranging.

13. The ranging method of claim 11, wherein the base station receives a half signal of a valid symbol interval of the ranging signal after a start point of a ranging symbol interval.

14. The ranging method of claim 11, wherein the ranging signal is generated by performing Fast Fourier Transform (FFT) on the valid symbol interval signal.

15. The ranging method of claim 11, wherein the ranging is performed by performing phase estimation using the restored ranging signal, and performing initial ranging with a transmitter if a ratio of a phase-estimated peak value to a phase-estimated average value exceeds a predetermined threshold.

16. The ranging method of claim 11, further comprising:
receiving a data signal of the terminal upon acquiring synchronization with a corresponding terminal by performing the ranging;
generating a valid symbol interval signal using the received data signal; and
restoring a data signal using the valid symbol interval signal.

17. The ranging method of claim 16, wherein the data signal is received before an end point of a ranging symbol interval of the base station.

18. The ranging method of claim 16, wherein the step of generating a valid symbol interval signal comprises:
copying the received data signal; and
inverting a sign of the copied data signal, and inserting the inverted data signal in front of the received data signal, thereby generating the valid symbol interval signal.

19. The ranging method of claim 16, wherein the ranging signal is generated by performing Fast Fourier Transform (FFT) on the valid symbol interval signal.

20. A ranging apparatus in a communication system, the apparatus comprising:
a terminal for generating a ranging code for ranging with a base station, mapping the ranging code to at least one sub-carrier so the ranging code is repeated in a time domain, generating a ranging signal so the mapped ranging code has a size of one symbol interval, and transmitting the generated ranging signal to the base station,
wherein the terminal transmits the ranging signal so at least half of a valid symbol interval of the ranging signal is received after a start point of a ranging symbol interval of the base station.

21. The ranging apparatus of claim 20, wherein the ranging is initial ranging.

22. The ranging apparatus of claim 20, wherein the terminal comprises:
a ranging code generator for generating a ranging code for ranging with the base station; and
a ranging channel former for forming a ranging channel by mapping the ranging code to the sub-carrier so the ranging code is repeated in a time domain.

23. The ranging apparatus of claim 22, wherein the ranging channel former maps the ranging code to at least one even sub-carrier.

24. The ranging apparatus of claim 20, wherein the ranging signal has a same size as a size of one ranging symbol interval of the base station.

25. The ranging apparatus of claim 20, wherein the terminal includes an Inverse Fast Fourier Transform (IFFT) unit for generating the ranging signal by performing IFFT on the ranging code mapped to the sub-carrier.

26. The ranging apparatus of claim 20, wherein the terminal further comprises:
a data channel former for mapping transmission data to at least one sub-carrier so the data signal is repeated upon acquiring synchronization with the base station through the ranging signal; and
an interval extractor for nulling a predetermined interval in the data signal mapped to the sub-carrier, and extracting the data signal.

27. The ranging apparatus of claim 26, wherein the data channel former maps the data signal to at least one odd sub-carrier.

28. The ranging apparatus of claim 26, wherein the predetermined interval is a leading half of a valid symbol interval of the data signal.

29. The ranging apparatus of claim 26, wherein the terminal transmits a data symbol so the data symbol is received before an endpoint of the ranging symbol interval of the base station.

30. The ranging apparatus of claim 26, wherein the terminal includes an Inverse Fast Fourier Transform (IFFT) unit for generating the data signal by performing IFFT on the data mapped to the sub-carrier.

31. A ranging apparatus in a communication system, the apparatus comprising:
a base station for receiving a ranging signal, extracting a half signal of a valid symbol interval of the ranging signal, generating a valid symbol interval signal by repeating the extracted half signal of the valid symbol interval, restoring a ranging signal using the valid symbol interval signal, and performing ranging using the ranging signal.

32. The ranging apparatus of claim 31, wherein the ranging is initial ranging.

33. The ranging apparatus of claim 31, wherein the base station comprises:
a valid symbol interval extractor for receiving a ranging signal, and extracting a half signal of a valid symbol interval of the ranging signal;
a valid symbol interval repeater for generating a valid symbol interval signal by repeating the extracted half signal of a valid symbol interval; and
a ranging channel extractor for restoring a ranging signal using the valid symbol interval signal, and performing ranging using the restored ranging signal.

34. The ranging apparatus of claim 31, wherein the base station receives a half signal of a valid symbol interval of the ranging signal after a start point of a ranging symbol interval.

35. The ranging apparatus of claim 31, wherein the base station includes a Fast Fourier Transform (FFT) unit for generating the ranging signal by performing FFT on the valid symbol interval signal.

36. The ranging apparatus of claim 31, wherein the ranging is performed by performing phase estimation using the restored ranging signal, and performing initial ranging with a transmitter if a ratio of a phase-estimated peak value to a phase-estimated average value exceeds a predetermined threshold.

37. The ranging apparatus of claim 31, wherein the base station further comprises:
a valid symbol interval extractor for, upon acquiring synchronization with a corresponding terminal by performing the ranging, receiving a data signal of the terminal, and extracting a half of a valid symbol interval;
a valid symbol interval repeater for copying a half of the valid symbol interval signal and inserting the copied data signal in front of the received data signal after inverting a sign thereof, thereby generating the valid symbol interval signal; and
a data channel extractor for restoring a data signal using the generated valid symbol interval signal.

38. The ranging apparatus of claim 37, wherein the data signal is received before an end point of a ranging symbol interval of the base station.

39. The ranging apparatus of claim 37, wherein the base station further comprises a Fast Fourier Transform (FFT) unit for generating the ranging signal by performing FFT on the valid symbol interval signal.

* * * * *